F. LOEDIGE.
GREASE CUP.
APPLICATION FILED DEC. 4, 1916.
1,218,677.
Patented Mar. 13, 1917.
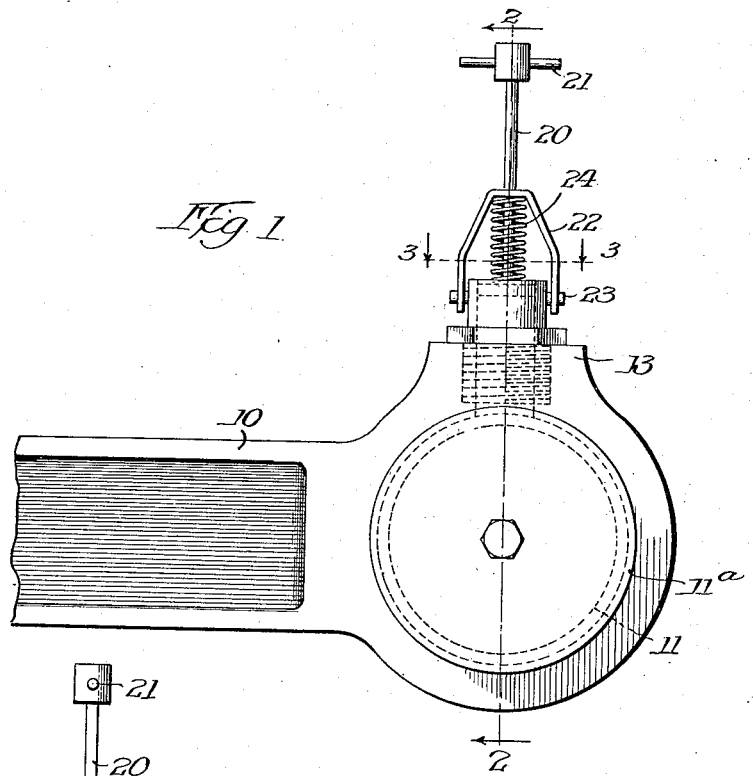
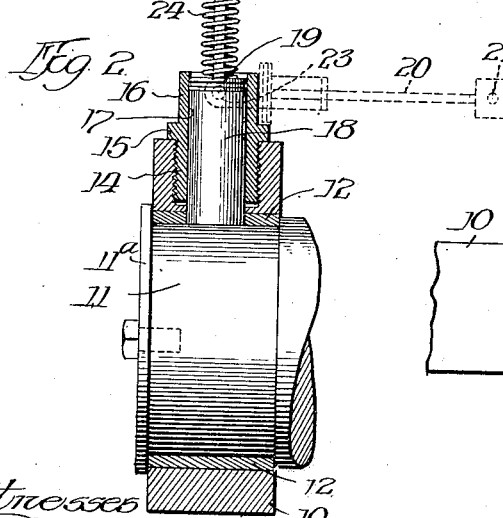
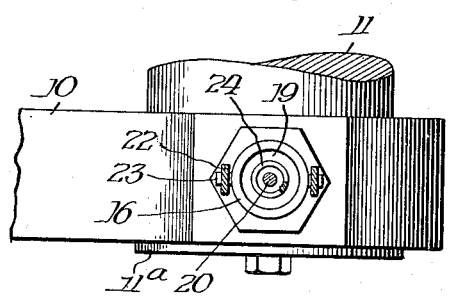
Inventor
Fred Loedige

UNITED STATES PATENT OFFICE.

FRED LOEDIGE, OF CHICAGO, ILLINOIS.

GREASE-CUP.

1,218,677.   Specification of Letters Patent.   Patented Mar. 13, 1917.

Application filed December 4, 1916. Serial No. 134,836.

*To all whom it may concern:*

Be it known that I, FRED LOEDIGE, a citizen of the United States, and resident of Chicago, in the county of Cook and State of Illinois, have invented certain new and useful Improvements in Grease-Cups, of which the following is a specification.

My invention relates to means for feeding lubricants to bearings and has particular reference to a novel spring compression device.

In the lubrication of locomotive journals, and particularly the bearing in the connection between the crank pin and the connecting rod, difficulty has been experienced in supplying adequate lubrication at all times.

In the ordinary screw cap grease cup a quantity of the grease is forced into the bearing when the screw is actuated, but there is, of course, no constant feed.

I have devised a grease cup of such construction as to adapt the same for use in connection with the stick grease; that is, the grease which is supplied in the form of a stick or cylinder. I have provided means whereby the spring-actuated plunger may be displaced from its position and a stick of the lubrication inserted, the plunger or piston being relocated by a single movement, all without making necessary the detachment of any part. This result is accomplished by providing a piston having a stem, a yoke pivoted on the casing and acting as a guide for the piston stem, and a spring interposed between the piston and the yoke. The spring, therefore, has the double function of advancing the piston and retaining the yoke in its operative position; that is, in a position in which the aperture therethrough is coincident with the axis of the opening through the casing.

The invention will be more readily understood by reference to the accompanying drawings, wherein—

Figure 1 is a side elevation of a portion of a connecting rod and crank pin to which my improvement has been applied;

Fig. 2 is a sectional view on the line 2—2 of Fig. 1, and

Fig. 3 is a sectional plan view on the line 3—3 of Fig. 1.

Referring more particularly to the drawings, it will be seen that the connecting rod 10 is mounted on the crank pin 11, a brass bushing 12 being located therebetween. The parts are held against displacement by the disk 13, which overlies the end of the pin.

The grease cup of my invention is seated in an apertured boss 13, at the end of the connecting rod, the cup comprising a cylindrical casing, the lower portion 14 of which is screw threaded to engage the threaded aperture in the boss 13 and an intermediate portion 15, of which is in the form of a hexagonal flange shaped to accommodate an actuating wrench. The upper portion 16 of the casing may be in the form of a plain cylinder and may be of such height as is desired, the consideration being the amount of grease necessary to be accommodated at one filling. The casing is provided with an axial opening 17 of uniform size from end to end thereof, the opening registering with a similar opening in the connecting rod and the bushing 12. A stick 18 of grease is shown in position in Fig. 2. As a means for advancing the grease into engagement with the bearing, I provide the piston 19, having a stem 20, the outer end of which stem is provided with a transverse bar or pin 21 for manual engagement. A yoke 22, best shown in Fig. 1, is pivoted on trunnions 23 secured to the cylindrical portion 16 of the casing, the yoke providing an aperture for the accommodation of the stem 20 in order to guide the same. A spring 24 is interposed between the piston 19 and the yoke, the spring having the double function of advancing the piston and maintaining the yoke in proper guiding relation.

When it is desired to refill the casing with grease, the piston, stem, yoke and spring are moved to the dotted-line position of Fig. 2; that is, the pin 21 is grasped by the operator and a pull exerted to press the spring and move the piston out of the opening, whereupon the parts may be swung to the indicated position. In this position the opening through the grease cup is unobstructed and a stick of grease, or grease in any other form, may be readily placed therein, after which the described movements are reversed and the parts placed in the position shown in the drawings.

I claim:

1. In a lubricating device, the combination of a casing providing a longitudinal opening therethrough, a piston mounted in said opening, a stem for said piston the free end of the stem being provided with a projection adapted for manual engagement, a pivoted member engaging and guiding said stem, and a spring interposed between said piston and said member and tending to advance said piston, substantially as described.

2. In a lubricating device, the combination of a casing providing a longitudinal opening of substantially uniform size from end to end of the casing, a piston mounted in said opening, a stem for said piston, a yoke for guiding said stem, said yoke being mounted for movement out of operative position, and a spring for simultaneously advancing said piston and maintaining said yoke in operative position.

3. In a lubricating device, the combination of a casing providing a longitudinal opening therethrough, a piston mounted in said opening, a stem for said piston, a stem-guiding member pivoted to said casing and adapted to be swung out of operative position, and a spring which bears at one end on said piston and at the other end on said member, substantially as described.

4. In a lubricating device, the combination of a cylinder, the exterior portion of one end of which is screw threaded and which is provided with an opening of substantially uniform size from end to end thereof, a yoke pivoted to the sides of the cylinder and provided with a guiding aperture so arranged as to be coincident with the axis of the opening through said cylinder when said yoke is swung to a position which bisects the opening in the cylinder, a piston having a stem for coöperation with the aperture in said yoke, and a spring interposed between the piston and the yoke, substantially as described.

5. In a lubricating device, the combination of a cup having an open upper end, a yoke pivoted to the cup, a piston and stem, said stem engaging said yoke and terminating in a hand-hold outside of said yoke, and a spring mounted to bear at one end on the piston and at the other end on the yoke, substantially as described.

6. In a lubricating device, the combination of a cup, a combined stem-guiding member and spring stop pivoted to the cup, a piston and stem, said stem engaging said pivoted member, and a spring mounted on said stem and bearing at one end against said pivoted member and at the other against said piston, the arrangement being such that all the movable parts may be swung out of the plane of the opening in said cup, substantially as described.

Signed at Chicago, Illinois, this 1st day of December, A. D. 1916.

FRED LOEDIGE.

Witnesses:
C. F. MURRAY,
T. D. BUTLER.

Copies of this patent may be obtained for five cents each, by addressing the "Commissioner of Patents. Washington, D. C."